United States Patent [19]

Agarwal et al.

[11] Patent Number: 4,543,385
[45] Date of Patent: Sep. 24, 1985

[54] BLEND COMPOSITIONS OF SULFO EPDM'S HAVING IMPROVED COMPRESSION SET PROPERTIES

[75] Inventors: Pawan K. Agarwal, Westfield; Ilan Duvdevani, Leonia; Robert D. Lundberg, Bridgewater, all of N.J.

[73] Assignee: Exxon Research and Engineering Co., Florham Park, N.J.

[21] Appl. No.: 566,348

[22] Filed: Dec. 28, 1983

[51] Int. Cl.$^4$ ........................ C08L 23/32; C08L 23/26
[52] U.S. Cl. .................................... 524/518; 524/127; 524/191; 524/280; 524/294; 524/394; 524/400; 524/399; 524/398; 524/426; 524/427; 524/417; 524/445; 524/451; 524/521; 524/525; 524/528; 524/236; 524/284; 525/194; 525/195; 525/196; 525/211; 525/212; 525/240
[58] Field of Search ............................... 525/194–196, 525/211, 240; 524/518, 528

[56] References Cited

U.S. PATENT DOCUMENTS 3,642,728 2/1972 Canter .................................. 525/379
3,974,241 8/1976 Lundberg et al. .................. 525/194
4,370,432 1/1983 Agarwal et al. .................... 525/194

Primary Examiner—Carman J. Seccuro
Attorney, Agent, or Firm—Richard E. Nanfeldt

[57] ABSTRACT

This invention relates to extrusion and injection moldable type elastomeric compositions having improved compression set properties and having a viscosity at 200° C. at 0.73 sec$^{-1}$ of about $8 \times 10^3$ to about $8 \times 10^5$ poises. The compositions used for elastomeric articles include a major portion of neutralized sulfonated EPDM terpolymer and a minor portion of an unsulfonated EPDM terpolymer or EP copolymer and optionally less than about 150 parts by weight of a non-polar process oil per 100 parts of the sulfonated polymer; less than about 300 parts by weight of a filler per 100 parts of the sulfonated polymer; and a preferential plasticizer at about 1 to about 60 parts by weight per 100 parts of the sulfonated elastomeric polymer.

These blend compositions can be readily processed due to their superior rheological properties on conventional plastic fabrication equipment into elastomeric articles having improved compression set properties characteristics.

15 Claims, No Drawings

BLEND COMPOSITIONS OF SULFO EPDM'S HAVING IMPROVED COMPRESSION SET PROPERTIES

FIELD OF THE INVENTION

This invention relates to extrusion and injectin moldable type elastomeric compositions having improved compression set properties and having a viscosity at 200° C. at 0.73 sec$^{-1}$ of about $8 \times 10^3$ to about $8 \times 10^5$ poises. The compositions used for elastomeric articles include a major portion of neutralized sulfonaed EPDM terpolymer and a minor portion of an unsulfonated EPDM terpolymer or EP copolymer and optionally less than about 150 parts by weight of a non-polar process oil per 100 parts of the sulfonated polymer; less than about 300 parts by weight of a filler per 100 parts of the sulfonated polymer; and a preferential plasticizer at about 1 to about 60 parts by weight per 100 parts of the sulfonated elastomeric polymer.

These blend compositions can be readily processed due to their superior rheological properties on conventional plastic fabrication equipment into elastomeric articles having improved compression set properties characteristics.

BACKGROUND OF THE INVENTION

Recently, a new class of thermoelastic sulfonated polymers has been described in a number of U.S. patents. These sulfonated polymers are derived from polymeric materials having olefinic unsaturation, especially elastomeric polymers such as Butyl and EPDM rubbers. U.S. Pat. No. 3,642,728, herein incorporated by reference, clearly teaches a method of selective sulfonation of olefinic unsaturation sites of an elastomeric polymer to form an acid form of a sulfonated elastomeric polymer. The olefinic sites of the elastomeric polymer are sulfonated by means of a complex of a sulfur trioxide donor and a Lewis base. The SO$_3$H groups of the sulfonated elastomer can be readily neutralized with a basic material to form an ionically cross-linked elastomer having substantially improved physical properties over an unsulfonated elastomer at room temperature. However, these ionically cross-linked elastomers, may be processed like a conventional thermoplastic at elevated temperatures under a shear force in the presence of selected preferential plasticizers which dissipate the ionic associations at the elevated temperatures thereby creating a reprocessable elastomer.

The basic materials used as neutralizing agents are selected from organic amines or basic materials selected from Groups I, II, III, IV, V, VI-B, VII-B and VIII and mixtures thereof of the Periodic Table of Elements. Although these sulfonated elastomeric polymers prepared by the process of this patent are readily useable in a certain number of limited applications, they are not as readily adaptable for the manufacture of an extrudable and injection moldable elastomeric article as are the improved compositions of the present invention, wherein both improved compression set and rheological properties are realized.

U.S. Pat. No. 3,836,511, herein incorporated by reference, teaches an improved process for the sulfonation of the olefinic sites of the elastomeric polymer, wherein the improved sulfonating agent is selected from acetyl sulfate, propionyl sulfate and butyryl sulfate. The neutralizing agents employed to neutralize the acid form of the sulfonated elastomeric polymers are organic amines. The resultant ionically cross-linked sulfonated elastomers prepared by this process do not exhibit both the improved compression set and rheological properties of the compositions of the present invention.

U.S. Pat. No. 3,870,841, herein incorporated by reference, teaches a method of plasticization of the polymeric backbone of a neutralized sulfonated plastic polymer by means of a polymer chain plasticizer which is a liquid compound having a boiling point of at least about 120° F. The polymer chain plasticizer is selected from a dialkyl phthalate, a process oil or an organic acid ester. Additionally, a domain plasticizer can be incorporated into the composition, wherein the domain plasticizer reversibly disrupts the association of the sulfonated groups at a temperature of forming. The compositions formed by this process are not suitable for the manufacture of high performance elastomeric articles formed by extrusion or injection molding process as are the compositions of the present invention.

U.S. Pat. No. 3,847,854, herein incorporated by reference, teaches a method of improving the processability of neutralized sulfonated elastomeric polymers by the addition of a preferential plasticizer which has at least one functional constituent which exhibits a bond moment whose absolute value is at least 0.6 Debyes, and must be a liquid at the desired processing temperature of the neutralized sulfonated elastomeric polymer. Again, the compositions of the present invention are more adaptable for use in the manufacture of high performance elastomeric articles.

Products resulting from the aforementioned methods for obtaining neutralized sulfonated elastomeric compositions, possess either unsuitable rheological properties or inferior compression set properties for the applications envisioned in the present invention.

For example, the physical properties of the resultant sulfonated elastomeric products of these aforementioned patents are unsuitable for major applications of automobile bumper parts, gaskets, weather stripping and various appliance parts.

U.S. Pat. No. 3,974,240 and No. 3,974,241 of the present inventors, filed on Nov. 18, 1974, describe the blending of a crystalline polyolefinic material with a neutralized sulfonated elastomeric polymer in an attempt to improve both the rheological and physical properties of the elastomeric polymer. The use of the crystalline polyolefinic material to improve both the stiffness as well as improving the melt viscosity of the composition was based in part upon the limitation of the use of fillers such as carbon black, clays, calcium carbonate or silicates as a single additive to the elastomeric polymer. Although fillers in combination with an elastomeric polymer increase the hardness of the composition, these fillers deteriorate the melt viscosity of the resultant composition. These materials are more adaptable for stiff elastomeric articles such as rubberized chair tips or wheels whereas the compositions of the present invention are more adapted for flexible elastomeric articles such as gaskets.

U.S. Pat. Nos. 4,220,573; 4,313,867; 4,118,360; 4,118,353; 4,166,751; 4,134,870; 4,151,137; 4,157,992; and 4,169,820 all teach the concept of using sulfonated polymers for the formation of elastomeric articles; however, none of these U.S. patents teach compositions with the improved compression set properties as exhibited by the compositions of the instant invention.

Sulfonated elastomeric polymers are somewhat defensive regarding their compression set characteristics when compared with other thermoplastic elastomers, e.g., block copolymers such as polyurethanes and very defensive when compared with vulcanized elastomers. In the past, various efforts have been made to improve their poor compression set characteristics. However, so far all the attempts to achieve the desired level of compression set by a process which can be considered a practical one have been unsuccessful.

Broadly speaking, compression set is a measure of the flexibility and elasticity of the material. Most often to measure the compression set of an elastomer, standard ASTM test (D-395) is used. The test is designed in such a way that it measures the material's ability to retain its elastic properties after a prolonged exposure to compressive stresses.

The present invention teaches that sulfonated EPDM samples varying in the type of cation when blended in small quantities with their precursor EPDM polymers or EP copolymers with similar structures yield compositions which have significantly improved compression set properties.

The unique and novel improved compositions of the present invention overcome the deficiencies of the aforementioned U.S. patents and applications from both a rheological and compression set properties aspect. The blend compositions of the present invention solve the problem of having a material which has both desirable rheological and compression set properties for the manufacture of an elastomeric article such as a gasket wherein the extrudate of the resultant compositions do not exhibit melt fracture during extrusion processing as is the case in some of the aforementioned patents.

SUMMARY OF THE INVENTION

It has been found suprisingly that compositions formed from blends of a major portion of a neutralized sulfonated EPDM terpolymer and a minor portion of an unsulfonated EPDM terpolymer or an EP copolymer and optionally, fillers, non-polar backbone oils and a preferential plasticizer have suitable rheological and compression set properties for the formation of an elastomeric article, such as gaskets, by an extrusion or injection molding process.

Accordingly, it is an object of our present invention to provide unique and novel compositions of matter for producing a high performance elastomeric article having improved compression set properties by an extrusion or injection molding process, wherein the compositions of the elastomeric articles have a viscosity at 0.73 sec$^{-1}$ at 200° C. of about $8 \times 10^3$ to about $8 \times 10^5$ poises, and a Shore A Hardness of about 40 to about 85.

It is the object of the instant invention to describe a class of compounds based on sulfonated ethylene-propylene terpolymers which can be processed on plastics type extrusion or injection molding equipment at high rates and which possess improved compression set characteristics. One of the essential aspects of the present invention comprises the discovery that only a restricted class of the subject sulfonated elastomers may be readily employed for extrusion or injection molding fabrication. The restrictions are primarily associated with processing and product performance characteristics. These characteristics are to a degree modulated by the type and concentration of various compounding ingredients. The compositions of the instant invention will, therefore, involve a class of compositions based on a restrictive class of sulfonated elastomers.

A substantial segment of the plastics and rubber fabrication industry employs fabrication techniques known as extrusion or injection molding to form articles which can be classified as sheet, profiles, tubing, film, and molded goods. The applications employing these fabrication techniques such as automobile bumper parts, weather stripping, refrigerator door seals, and gaskets, etc. require materials which are flexible and tough. Two broad classifications of materials which have been used are vulcanized elastomers and plasticized thermoplastics such as polyvinyl chloride (PVC). The fabrication of articles based on vulcanized elastomers is a major item of cost involving the vulcanization procedure. Not only is this step costly from an energy intensive viewpoint, but it is time consuming. The use of plasticating extrusion and injection molding for thermoplastic materials is more economical and results in high extrusion rates for materials such as plasticized PVC. While these materials possess a degree of flexibility, they do not have a good rubbery feel or good low temperature flexibility. It is therefore desirable to have materials which can be processed on plastics type processing equipment at conventional plastics rates and which possess the flexibility and subjective rubbery characteristics of vulcanized elastomers.

GENERAL DESCRIPTION

This present invention relates to unique and novel blend compositions having improved compression set properties of a major portion neutralized sulfonated EPDM terpolymer and a minor portion of an unsulfonated EPDM terpolymer or EP copolymer, and optionally, a filler, and a non-polar process oil, wherein the resultant composition has a viscosity at 0.73 sec$^{-1}$ at 200° C. of about $8 \times 10^3$ to about $8 \times 10^5$ poise, wherein the compositions are readily processable in a conventional extrusion or injection molding process into a high performance elastomeric article such as gaskets.

Various critically selected additives can be incorporated into the blend compositions such as a polyolefin thermoplastic for further modification of hardness as well as rheological properties, a pigment, an external, internal lubricant for improvement of the physical appearance such as shine of the finished article as well as the ability to easily process the composition during extrusion, and a reinforcing filler such as silica or carbon black, wherein the reinforcing filler constitutes a minor portion of the composition.

The neutralized sulfonated elastomeric polymers of this present instant invention are EPDM terpolymers.

The EPDM terpolymers which are used in the blend compositions as the unsulfonated species are similar or identical to those used to form the sulfonated EPDM terpolymers and are low unsaturated polymers having about 1 to about 10.0 wt% olefinic unsaturation, more preferably about 2 to about 8, most preferably about 3 to 7 defined according to the definition as found in ASTM-D-1418-64 and is intended to mean terpolymers containing ethylene and propylene in the backbone and a diene which introduces unsaturation in the side group. Illustrative methods for producing these terpolymers are found in U.S. Pat. No. 3,280,082, British Pat. No. 1,030,289 and French Pat. No. 1,386,600, which are incorporated herein by reference. The preferred polymers contain about 40 to about 75 wt% ethylene and about 1 to about 10 wt% of a diene monomer, the balance of the polymer being propylene. Preferably, the polymer contains about 45 to about 70 wt% ethylene, e.g. 50 wt% and about 2.6 to about 8.0 wt% diene monomer, e.g. 5.0 wt%. The diene monomer is preferably a non-conjugated diene.

Illustrative of these non-conjugated diene monomers which may be used in the terpolymer (EPDM) are 1,4-hexadiene, dicyclopentadiene, 5-ethylidene-2-norbornene, 5-methylene-2-norbornene, 5-propenyl-2-norbornene, and methyl tetrahydroindene.

A typical EPDM is Vistalon 2504 (Exxon Chemical Co.), a terpolymer having a Mooney viscosity (ML, 1+8, 212° F.) of about 40 and having an ethylene content of about 50 wt% and a 5-ethylidene-2-norbornene content of about 5.0 wt%. The $\overline{M}_n$ of Vistalon 2504 is about 47,000, the $\overline{M}_v$ is about 145,000 and the $\overline{M}_w$ is about 174,000.

Another EPDM terpolymer Vistalon 2504-20 is derived from Vistalon 2504 (Exxon Chemical Co.) by a controlled extrusion process, wherein the resultant Mooney viscosity at 212° F. is about 20. The $\overline{M}_n$ of Vistalon 2504-20 is about 26,000, the $\overline{M}_v$ is about 90,000 and the $\overline{M}_w$ is about 125,000.

Nordel 1320 (DuPont) is another terpolymer having a Mooney viscosity at 212° F. of about 25 and having about 53 wt% of ethylene, about 3.5 wt% of 1,4-hexadiene, and about 43.5 wt% of propylene.

The EPDM terpolymers of this invention have a number average molecular weight ($\overline{M}_n$) of about 10,000 to about 200,000, more preferably of about 15,000 to about 100,000, most preferably of about 20,000 to about 60,000. The Mooney viscosity (ML, 1+8, 212° F.) of the EPDM terpolymer is about 5 to about 60, more preferably about 10 to about 50, most preferably about 15 to about 40. The $\overline{M}_v$ of the EPDM terpolymer is preferably below about 350,000 and more preferably below about 300,000. The $\overline{M}_w$ of the EPDM terpolymer is preferably below about 500,000 and more preferably below about 350,000.

The EP copolymer of the instant invention have a molecular weight $\overline{M}_n$ of about 10,000 to about 200,000, and more preferably about 15,000 to about 100,000 and the copolymer has about 40 to about 75 weight percent ethylene therein.

In carrying out the sulfonation of the EPDM terpolymer of the instant invention, the EPDM terpolymer is dissolved in a non-reactive solvent such as a chlorinated aliphatic solvent, chlorinated aromatic hydrocarbon, an aromatic hydrocarbon, or an aliphatic hydrocarbon such as carbon tetrachloride, dichloroethane, chlorobenzene, benzene, toluene, xylene, cyclohexane, pentane, isopentane, hexane, isohexane or heptane. The preferred solvents are the lower boiling aliphatic hydrocarbons. A sulfonating agent is added to the solution of the EPDM terpolymer and non-reactive solvent at a temperature of about −100° C. to about 100° C. for a period of time of about 1 to about 60 minutes, most preferably at room temperature for about 5 to about 45 minutes; and most preferably about 15 to about 30. Typical sulfonating agents are described in U.S. Pat. Nos. 3,642,728 and 3,836,511, previously incorporated herein by reference. These sulfonating agents are selected from an acyl sulfate, a mixture of sulfuric acid and an acid anhydride or a complex of a sulfur trioxide donor and a Lewis base containing oxygen, sulfur, or phosphorus. Typical sulfur trioxide donors are $SO_3$, chlorosulfonic acid, fluorosulfonic acid, sulfuric acid, oleum, etc. Typical Lewis bases are: dioxane, tetrahydrofuran, tetrahydrothiophene or triethyl phosphate. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a chlorinated aliphatic or aromatic hydrocarbon.

It should be pointed out that neither the sulfonating agent nor the manner of sulfonation is critical, provided that the sulfonating method does not degrade the polymeric backbone of the EPDM terpolymer. The reaction is quenched with an aliphatic alcohol such as methanol, ethanol or isopropanol, with an aromatic hydroxyl compound, such as phenol, a cycloaliphatic alcohol such as cyclohexanol or with water. The unneutralized sulfonated EPDM terpolymer has about 10 to about 100 meq sulfonated groups per 100 grams of sulfonated polymer, more preferably about 15 to about 50; and most preferably about 20 to about 40. The meq of sulfonate groups per 100 grams of polymer is determined by both titration of the polymeric sulfonic acid and Dietert Sulfur analysis. In the titration of the sulfonic acid, the polymer is dissolved in solvent consisting of 95 parts of toluene and 5 parts of methanol at a concentration level of 50 grams per liter of solvent. The unneutralized form is titrated with ethanolic sodium hydroxide to an Alizarin-Thymolphthalein end-point.

The unneutralized sulfonated EPDM terpolymer is gel free and hydrolytically stable. Gel is measured by stirring a given weight of polymer in a solvent comprised of 95 toluene-5-methanol at a concentration of 5 wt%, for 24 hours, allowing the mixture to settle, withdrawing a weighted sample of the supernatant solution and evaporating to dryness.

Hydrolytically stable means that the acid function, in this case the sulfonic acid, will not be eliminated under neutral or slightly basic conditions to a neutral moiety which is incapable of being converted to highly ionic functionality.

Neutralization of the unneutralized sulfonated EPDM terpolymer is done by the addition of a solution of a basic salt to the acid form of the sulfonated elastomeric polymer dissolved in the mixture of the aliphatic alcohol and non-reactive solvent. The basic salt is dissolved in a binary solvent system consisting of water and/or an aliphatic alcohol. The counterion of the basic salt is selected from the group consisting of antimony, iron, aluminum, lead, and Groups I-A, II-A, I-B and II-B of the Periodic Table of Elements and mixtures thereof. The anion of the basic salt is selected from the group consisting of a carboxylic acid having from about 1 to about 4 carbon atoms, a hydroxide, or alkoxide and mixtures thereof. The preferred neutralizing agent is a metal acetate, more preferably zinc acetate. Sufficient metal salt of the carboxylic acid is added to the solution of the unneutralized sulfonate EPDM terpolymer to effect neutralization. It is preferable to neutralize at least 95% of the sulfonate groups, more preferably about 98%, most preferably 100%.

Examples of metal oxides useful in preparing metal sulfonates are MgO, CaO, BaO, ZnO, $Ag_2O$, $PbO_2$ and $Pb_3O_4$. Useful examples of metal hydroxides are NaOH, KOH, LiOH, $Mg(OH)_2$ and $Ba(OH)_2$. The resultant neutralized sulfonated EPDM terpolymer has a viscosity at 0.73 sec$^{-1}$ at 200° C. of about $3 \times 10^5$ poises to about $5 \times 10^6$ poises, more preferably of about $5 \times 10^5$ poises to about $5 \times 10^6$ poises and most preferably about $5 \times 10^5$ poises to about $3.5 \times 10^6$ poises.

A means of characterizing the apparent molecular weight of a polymer involves the use of melt rheological measurements. For ionic polymers, this is the preferred method since solution techniques are difficult to interpret due to the complex nature of the ionic association. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this invention the relationship will be assumed to be one of direct proportionality. Thus, in comparing two materials, the one with the higher melt viscosity will be associated with the higher apparent molecular weight.

The melt viscosity of the systems investigated were determined by the use of an Instron Capillary Rheometer. Generally, the melt viscosity measurements were made at a temperature of 200° C. and at various shear rates corresponding to crosshead speeds from 0.005 in/min to 20 in/min. The apparent viscosity at 200° C. and at a shear rate of 0.73 sec$^{-1}$ (0.005 in/min) is employed as a characterization parameter in this invention. A measure of the melt elasticity of a given system can also be obtained from these rheological measurements. A type of flow instability known as melt fracture is exhibited by many polymeric materials of high molecular weight. This phenomenon is shear sensitive and thus will generally exhibit itself at a given shear rate and temperature. The shear rate for the onset of melt fracture indicates the upper shear rate for processing a given material. This is used as a characterization parameter for compounds employed in extrusion processing.

The metal neutralized sulfonated EPDM terpolymers at the higher sulfonate levels possess extremely high melt viscosities and are thereby difficult to process. The addition of ionic group plasticizers markedly reduces melt viscosity and frequently enhances physical properties.

To the neutralized sulfonated EPDM terpolymer is added, in either solution or to the crumb form of the sulfonated elastomeric polymer, a preferential plasticizer selected from the group consisting of carboxylic acids having about 5 to about 30 carbon atoms, more preferably about 8 to about 22 carbon atoms, and basic salts of these carboxylic acids, wherein the metal ion of the basic salt is selected from the group consisting of aluminum, ammonium, lead and Groups I-A, II-A, I-B and II-B of the Periodic Table of Elements and mixtures thereof. The carboxylic acids are selected from the group consisting essentially of lauric, myristic, palmitic or stearic acids and mixtures thereof; e.g. zinc stearate, magnesium stearate, or zinc laurate.

The preferential plasticizer is incorporated into the neutralized sulfonated elastomeric polymer at about 1 to about 60 parts by weight per 100 parts of the neutralized sulfonated EPDM terpolymer more preferably at about 5 to about 40, and most preferably at about 7 to about 25. The metallic salt of the fatty acid can also be used as neutralizing agent. In the case of the neutralizing agent and plasticizer being the identical chemical species, additional metallic salt is added over the required levels of neutralization. Alternatively, other preferential plasticizers are selected from organic esters, phenols, trialkyl phosphates, alcohols, amines, amides, ammonium and amine salts of carboxylic acids and mixtures thereof. The preferred plasticizers are selected from the group consisting of fatty acid and metallic salts of fatty acid and mixtures thereof. The resultant neutralized sulfonated EPDM terpolymer with preferential plasticizer is isolated from the solution by conventional steam stripping and filtration.

The resultant neutralized and plasticized sulfonated EPDM terpolymer has a viscosity at 200° C. and a shear rate of 0.73 sec$^{-1}$ of about $5 \times 10^4$ poise to about $5 \times 10^6$ poise, more preferably of about $1 \times 10^5$ poise to about $1 \times 10^6$ poise and most preferably of about $2 \times 10^5$ poise to about $1 \times 10^6$ poise.

The neutralized sulfonated EPDM terpolymer is blended with an unsulfonated EPDM terpolymer or an EP copolymer and optionally a filler and a non-polar backbone process oil by techniques well known in the art. For example, the blend composition can be compounded on a two-roll mill. Other methods known in the art which are suitable for making these compositions include those methods employed in the plastic and elastomer industries for mixing polymer systems. An excellent polymer blend composition of this invention can be obtained through the use of a high shear batch intensive mixer called the Banbury. Alternatively, economic advantages in terms of time and labor savings can be obtained through the use of a Farrel Continuous Mixer, a twin screw extruder, or tandem extrusion techniques which are continuous mixing types of equipment. The Banbury mixing device is the preferred batch type mixer, and the twin screw extruder is the preferred continuous mixer.

The amount of unsulfonated EPDM terpolymer or EP copolymer in the blend composition comprises about 2 to about 46 parts by weight per 100 parts of the metal neutralized sulfonated EPDM terpolymer, more preferably about 3 to about 35 and most preferably about 4 to about 30.

The fillers which can be optionally employed in the present invention are selected from the group consisting of carbon blacks, talcs, ground calcium carbonate, water precipitated calcium carbonate, and delaminated, calcined and hydrated clays and mixtures thereof. These fillers are incorporated into the blend composition at less than about 300 parts by weight per 100 parts of the neutralized sulfonated EPDM terpolymer, more preferably at less than about 250; and most preferably at less than about 200. Typically, these fillers have a particle size of about 0.01 to about 20 microns, more preferably less than about 15, and most preferably less than about 10. The oil absorption as measured by grams of oil absorbed by 100 grams of the inorganic filler is about 10 to about 100, more preferably about 10 to about 85 and most preferably about 10 to about 75. Typical inorganic fillers employed in this invention are illustrated in Table I. Reinforcing fillers such as carbon blacks typically have sizes below 0.1 microns and oil absorption above about 100. These reinforcing fillers are optionally incorporated alone or in addition to non-reinforcing fillers at a ratio of less than 1 part of reinforcing filler to 1 part of non-reinforcing filler, more preferably less than about 0.5 and most preferably less than about 0.3.

TABLE I

| Filler | Code # | Oil Absorption grams of oil/ 100 grams of filler | Specific gravity | Avg. Particle Size Micron | pH |
|---|---|---|---|---|---|
| calcium carbonate ground | Atomite | 15 | 2.71 | | 9.3 |
| calcium carboante precipitated | Purecal U | 35 | 2.65 | .03–.04 | 9.3 |
| delaminated clay | Polyfil DL | 30 | 2.61 | 4.5 | 6.5–7.5 |
| hydrated clay | Suprex | | 2.6 | 2 | 4.0 |
| calcined clay | Icecap K | 50–55 | 2.63 | 1 | 5.0–6.0 |
| talc magnesium silicate | Mistron Vapor | 60–70 | 2.75 | 2 | 9.0–7.5 |
| alumino silicate | | | | | |

The oils which can be optionally employed in the present invention are non-polar process oils having less than about 2 wt% polar type compounds as measured by molecular type clay gel analysis. These oils are selected from paraffinics ASTM Type 104B as defined in ASTM-D-2226-70, aromatics ASTM Type 102 or naphthenics ASTM Type 104A, wherein the oil has a flash point by the Cleveland open cup of at least 350° F., a pour point of less than 40° F. a viscosity of about 70 to about 3000 s.s.u.'s at 100° F. and a number average molecular weight of about 300 to about 1000, and more preferably about 300 to 750. The preferred process oils are paraffinics. Table II illustrates typical oils encompassed by the scope of this invention.

The oils are optionally incorporated into the blend composition at a concentration level of less than about 150 parts by weight per 100 parts of the neutralized sulfonated EDPM terpolymer; more preferably at about 5 to about 150, and most preferably at about 10 to about 150.

TABLE II

| Type Oil | Oil Code # | Viscosity ssu | $M_n$ | % Polars | % Aromatic | % Saturates |
|---|---|---|---|---|---|---|
| Paraffinic | Sunpar 115 | 155 | 400 | 0.3 | 12.7 | 87.0 |
| Paraffinic | Sunpar 180 | 750 | 570 | 0.7 | 17.0 | 82.3 |
| Paraffinic | Sunpar 2280 | 2907 | 720 | 1.5 | 22.0 | 76.5 |
| Paraffinic | Tufflo 6056 | 495 | — | 0.0 | 0.9 | 99.1 |
| Aromatic | Flexon 340 | 120 | — | 1.3 | 70.3 | 28.4 |
| Naphthenic | Flexon 765 | 505 | — | 0.9 | 20.8 | 78.3 |
| Naphthenic | Tufflo 6054 | 580 | — | 0.0 | 8.0 | 92.0 |

The compression set measurements (ASTM D-395 Test B) of the composition of the instant invention involve the compression of disk-shaped speciments to 75% of its thickness under flat steel plates by suitable mechanical means for a specified period of time and temperature. The choice of the temperature and time can be varied depending upon the end use of the material. For comparative tests, however, identical time and temperature should be maintained.

After the specified period of time, the load from the specimen is released, and the height of the sample is measured after 30 minutes of waiting period. Compression set of the material is determined by the following equation:

$$C = \frac{T_o - T_i}{T_o - T_s} \times 100$$

where C is the compression set expressed as % of the original deflection, $T_o$ is the original thickness of the specimen, $T_i$ is the thickness after removal of the load, and $T_s$ is the compressed thickness (spacer bar thickness).

From this equation it is clear that if the height of the recovered sample ($T_i$) is equal to its initial height ($T_o$), the compression set is equal to zero. The material is such a case is said to be highly elastic in nature. However, if the material undergoes plastic flow such that there is no recovery, i.e., the "recovered height" of the material ($T_i$) is equal to the compressed height ($T_s$), the compression set is 100%.

DETAILED DESCRIPTION

The advantages of both the rheological and physical properties of the blend compositions of the present invention can be more readily appreciated by reference to the following examples and tables. Unless otherwise specified, all measurements are in parts per hundred by weight.

EXAMPLE 1

Various blends of compositions shown in Table 1 were prepared on a hot, two-roll mill. The temperature of the mill was kept around 375° F. The milling time was varied from about 10 minutes to 20 minutes. This length of time was needed to ensure the complete mixing of the individual components of the blend.

The compression set pads of 1"×4" and 1/8" thick were molded in a hot press. The molding temperature varied from about 350° to 390° F. The lower temperature was used for the Zn salt and the higher temperature for the Ba and Mg salts. The 1/2" diameter disks were punched out from the pads using a sharp die and following method ASTM D-395 Test B compression set data were taken at room temperature, 23° C., and at 70° C. The time of the compressive loading was 22 hours. Prior to the application of load, the samples were conditioned by putting them in the vacuum oven overnight and then at 60° C. for about six hours. Samples were cooled to room temperature under vacuum.

The composition of the blends and the compression data are shown in Table 1. The EPDM polymer used in blending was the same polymer used for sulfonation.

TABLE 1

Composition and Compression Set Characteristics* of Blends of Sulfo EPDM and EPDM

| Blend Number | 1 | 2 | 3 | 4 | 5 |
|---|---|---|---|---|---|
| Sulfo EPDM (20 meq. Zn Salt) | 100 | 95 | 90 | 80 | 50 |
| EPDM | — | 5 | 10 | 20 | 50 |
| % Compression Set | 21 | 6 | 12 | 46 | 70 |

*Method ASTM D-395-B; room temperature, 22 hours.

EXAMPLE 2

In this series of experiments various blends incorporating an ionic plasticizer, zinc stearate, were prepared and tested for their compression set properties. The blending and measurement techniques as well as the polymeric blend ingredients were the same as in Example 1. The composition and compression set properties of this example are shown in Table 2.

TABLE 2

Composition and Compression Set Characteristics of Blends of Sulfo EPDM and EPDM's with Plasticizers

| Blend Number | 1 | 2 | 3 | 4 | 5 | 6 | 7 | 8 |
|---|---|---|---|---|---|---|---|---|
| Sulfo EPDM (20 meq. Zn Salt) | 100 | 100 | 100 | 95 | 90 | 80 | 90 | 90 |
| EPDM | — | — | — | 5 | 10 | 20 | 10 | 10 |
| Zinc Stearate | 5 | 10 | 20 | 10 | 10 | 10 | 5 | 20 |
| % Compression Set* | | | | | | | | |
| Room Temperature | 9 | 8 | 11 | 8 | 7 | 9 | 8 | 11 |
| 70° C. | 80 | 87 | 94 | 91 | 73 | 82 | 91 | 88 |

*Method ASTM D-395-B; both room temperature and 70° C. for 22 hours.

Here again, one notices the good compression set values of the blends incorporating EPDM. For example, comparing blend #s 2 and 5 with each other, it is seen that at 70° C. the blend #5 which contains 10 parts of the EPDM has about 20% better compression set values over blend #2. Since the zinc stearate plasticizer in sulfo EPDM polymers not only acts as a flow improver but also acts as a reinforcing filler, the room temperature compression set values are masked. And, hence all the compression set values of these blends are close to each other and cannot be discerned clearly on a quantitative basis.

EXAMPLE 3

For practical applications compounds of polymers incorporating various types of ingredients such as fillers, processing oil, plasticizers etc. are often needed. The exact amounts and type of such ingredients depend upon the specific end use and application of the material. In order to test the concept of the present invention we prepared a series of compounds of compositions shown in Table 3. The blending of these compounds was done on a lab size Brabender mixer at about 375° F. for about 25 minutes. The molding and testing of the samples were done as in Example 1. All the data are listed in Table 3. The EDPM polymer used for blending was the same polymer used for the preparation of the various sulfo-EPDM salts.

TABLE 3

Composition and Compression set Properties of Various Compounds Incorporating Blends of Sulfo EPDM and EPDM Polymers

| Blend Number | 1 | 2 | 3 | 4 | 5 | 6 | 7 | 8 |
|---|---|---|---|---|---|---|---|---|
| Sulfo-EPDM (20 meq Zn salt) | 100 | 95 | 90 | 80 | — | — | — | — |
| Sulfo EPDM (20 meq Ba salt) | — | — | — | — | 100 | 90 | — | — |
| Sulfo EPDM (20 meq Mg salt) | — | — | — | — | — | — | 100 | 90 |
| EPDM | — | 5 | 10 | 20 | — | 10 | — | 10 |
| Tufflo oil 6056 | 30 | 30 | 30 | 30 | 30 | 30 | 30 | 30 |
| Zinc Stearate | 10 | 10 | 10 | 10 | 10 | 10 | 10 | 10 |
| Irganox 1010 | 0.2 | 0.2 | 0.2 | 0.2 | 0.2 | 0.2 | 0.2 | 0.2 |
| % Compression Set* | 15 | 13 | 12 | 16 | 6 | 3 | 16 | 10 |

*Method ASTM D-395-B; Room Temp; 22 hrs.

From the above table its clear that the compounds incorporating small amounts of EPDM have significantly better compression set values over the control. (e.g. compare blends 3 with 1, 6 with 5 and 8 and 7).

What is claimed is:

1. An elastomeric blend composition having improved compression set properties of less than about 16 percent at 25° C. and having a viscosity at 0.73 sec$^{-1}$ and at 200° C. of about $8 \times 10^3$ to about $8 \times 10^5$ poises, said composition formable into an elastomeric article, consisting essentially of:
   (a) a neutralized sulfonated EPDM terpolymer having a viscosity at 0.73 sec$^{-1}$ and at 200° C. of about $5 \times 10^4$ poises to about $5 \times 10^6$ poises and about 10 to about 50 meq. sulfonate groups per 100 grams of said sulfonated EPDM terpolymer, said sulfonate groups being neutralized; and
   (b) about 2 to about 46 parts by weight of an an EPDM terpolymer, said EPDM terpolymer being the same EPDM terpolymer as said EPDM terpolymer used to form said sulfonated EPDM terpolymer.

2. A composition according to claim 1 further including about 1 to about 60 parts by weight of a preferential plasticizer per 100 parts of said sulfonated EPDM terpolymers.

3. A composition according to claims 1 or 2, wherein said sulfonated groups are neutralized with a counterion being selected from the group consisting of antimony, iron, aluminum, lead and Groups I-A, II-A, I-B and II-B of the Periodic Table of Elements and mixtures thereof.

4. A composition according to claim 1, wherein said EPDM terpolymer consists of about 40 to about 75 wt% of ethylene, of about 10 to about 58 wt% of propylene and of about 2 to about 10 wt% of a non-conjugated diene.

5. A composition according to claim 4, wherein said non-conjugated diene is selected from the group consisting of 1,4-hexadiene, dicyclopentadiene, 5-alkylidene-2-norbornenes, 5-alkenyl-2-norbornenes and tetrahydroindene.

6. A composition according to claim 5, wherein said non-conjugated diene is 5-ethylidene-2-norbornene.

7. A composition according to claim 1 or 2, further including less than about 300 parts by weight of a filler per 100 parts of said sulfonated EPDM terpolymer.

8. A composition according to claim 1 further including less than about 150 parts by weight of a non-polar process oil per 100 parts of said sulfonated EPDM terpolymer.

9. A composition according to claim 2, wherein said preferential plasticizer has a melting point of at least 25° C. and is selected from the group consisting of carboxylic acids having at least 8 carbon atoms, metallic salts of said carboxylic acids, phenols, phosphates, amides, ammonium and amine salts of said carboxylic acids, and amines and mixtures thereof.

10. A composition according to claims 2 or 9, wherein said preferential plasticizer is a combination of a carboxylic acid and metallic salt of said carboxylic acid, a metal ion of said metallic salt being selected from the group consisting of aluminum, antimony, iron, lead and Groups I-A, II-A, I-B, and II-B of the Periodic Table of Elements and mixtures thereof.

11. A composition according to claim 10, wherein said metallic salt is selected from the group consisting of zinc stearate or calcium stearate.

12. A composition according to claim 7, wherein said filler is selected from the group consisting of clay, talc and calcium carbonate, and mixtures thereof.

13. A composition according to claim 7, wherein said filler is selected from the group consisting of carbon blacks.

14. A composition according to claim 8, wherein said non-polar process oil is selected from the group consisting of paraffinic, naphthenic and aromatics and mixtures thereof.

15. A composition according to claim 1, 2, or 8 further including up to about 100 parts by weight of an olefinic thermoplastic polymer per 100 parts of said sulfonated EPDM terpolymer.

* * * * *